United States Patent [19]

Tkac et al.

[11] Patent Number: 4,504,361

[45] Date of Patent: Mar. 12, 1985

[54] BLOCK SHORT-WAY EVAPORATOR WITH WIPED-OFF FILM

[75] Inventors: Alexander Tkac; Jan Cvenglos, both of Bratislava, Czechoslovakia

[73] Assignee: Slovenska vysoka skola technicka v Bratislava, Bratislava, Czechoslovakia

[21] Appl. No.: 388,741

[22] Filed: Jun. 15, 1982

[30] Foreign Application Priority Data

Jun. 22, 1981 [CS] Czechoslovakia ............ 4670-81

[51] Int. Cl.³ ............................................. B01D 1/22
[52] U.S. Cl. .................................... 202/172; 202/173;
202/205; 202/236; 202/175; 159/6.2; 159/13 R;
203/72; 203/77; 203/80
[58] Field of Search ............... 202/236, 205, 158, 175,
202/173, 172, 264; 159/5, 6.2, 13 R, 13 B, 17 R;
203/72, 89, 91, 20, 71, 73, 74, 80, 77

[56] References Cited

U.S. PATENT DOCUMENTS

| | | | |
|---|---|---|---|
| 1,501,515 | 7/1924 | Testrup | 202/236 |
| 2,137,553 | 11/1938 | Vigers et al. | 202/236 |
| 2,703,310 | 3/1955 | Kretchmar | 202/236 |
| 2,855,345 | 10/1958 | Mares | 202/236 |
| 2,861,925 | 11/1958 | Mende | 202/236 |
| 2,894,879 | 7/1959 | Hickman | 202/236 |
| 2,955,990 | 10/1960 | Smith | 203/72 |
| 2,975,108 | 3/1961 | Watt | 202/236 |
| 3,136,707 | 6/1964 | Hickman | 202/236 |
| 3,271,271 | 9/1966 | Watt | 202/236 |
| 3,271,272 | 9/1966 | Watt | 202/236 |
| 3,997,406 | 12/1976 | Arvanitakis | 202/175 |
| 4,053,006 | 10/1977 | Tkac et al. | 202/236 |
| 4,225,538 | 9/1980 | Shafranovksy et al. | 202/236 |

Primary Examiner—Wilbur Bascomb

[57] ABSTRACT

Block short-way evaporator with wiped-off film for vacuum and molecular distillation which is suitable for large-scale production. The evaporator is composed of one or more vacuum chambers in which parallel vertical double-sided flat evaporators with wipers for wiping evaporating areas and double-sided flat condensers are alternately located so that they form a continuous block. On the bottom of each chamber distillate collecting troughs with distillate tubes are formed alternately below double-sided flat condensers using separating partitions, and below double-sided flat evaporators residue collecting troughs with residue outlet tubes are formed, feed tubes being led through the bottom and the double-sided flat evaporators into separating troughs in the upper part of the double-sided flat evaporators. For multistage distillation, the feed tube of the vacuum chamber of higher vacuum stage is connected with the residue outlet tube of the vacuum chamber of lower vacuum stage for the successive collection of fractions, or it is connected with the distillate outlet tube of the vacuum chamber of lower vacuum stage for redistillation in such way that it forms a liquid seal between the lower vacuum stage and the higher vacuum stage.

8 Claims, 6 Drawing Figures

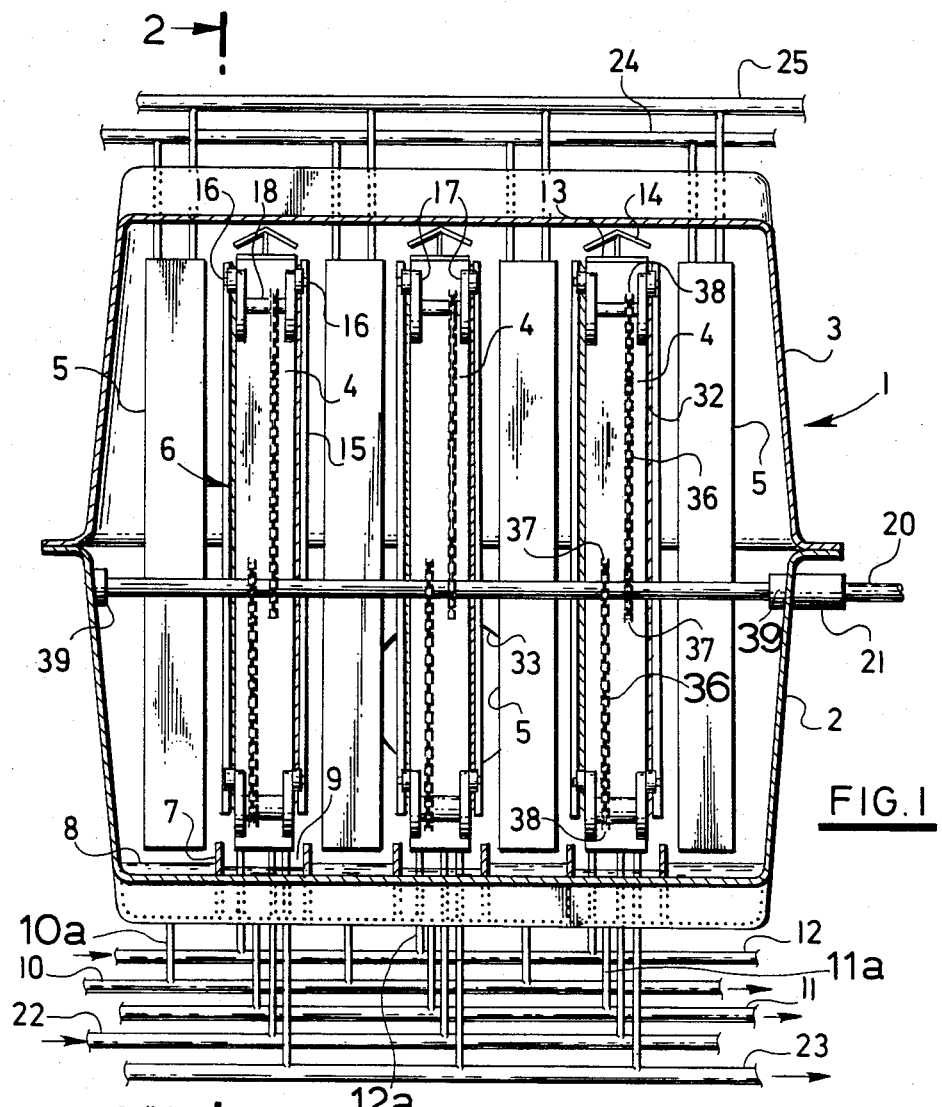
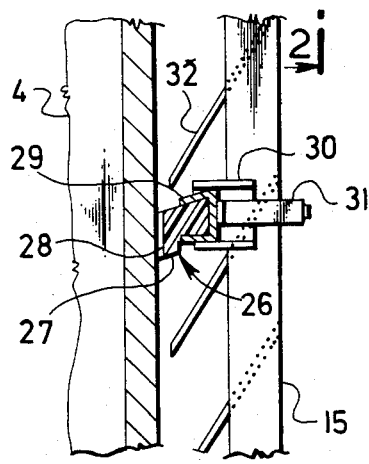
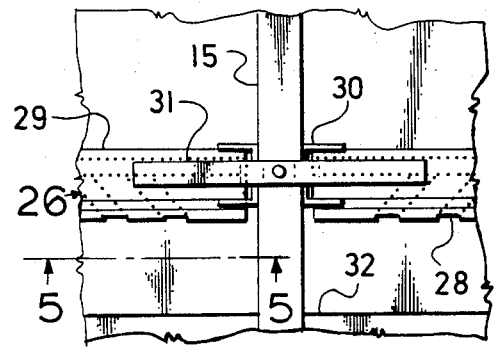
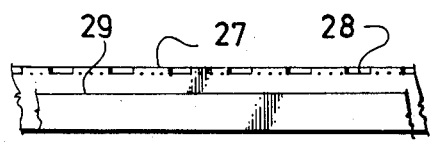
FIG. 1
FIG. 3
FIG. 4
FIG. 5

BLOCK SHORT-WAY EVAPORATOR WITH WIPED-OFF FILM

The invention relates to a block short-way evaporator with wiped-off film for large-scale one-stage or multistage vacuum and molecular distillation.

All the up-to-now known short-way evaporators with wiped-off film have the evaporating area on the external surface of a cylinder, for example, according to the Czechoslovak Author's Certificate No. 181 054, or on its internal surface, for example, according to U.S. Pat. No. 3,020,211. Although both these types of evaporators are characterized by high specific evaporative capacity, their capacity is not sufficient for many industrial productions. At a limiting height of the evaporating cylinder, which height is given by processing parameters as 2 to 3 m, enlargement of the evaporating area by increasing the cylinder diameter is limited by strength and engineering-production factors. When the evaporating cylinder is taller than the optimum height, utilization of the evaporating area requires a high liquid loading of the evaporator periphery by processed liquid; this leads to rough and fast-flowing-down films; as a consequence the specific evaporative capacity of the equipment decreases. With an increase in diameter of the evaporating cylinder, the thickness of its sidewall also increases with a consequent worse heat transfer which again decreases the specific evaporative capacity. A machine having evaporating cylinders with a diameter larger than 1.5 m is technically too large, the curvature of the cylinder falling below admissible tolerance. Increasing the capacity of operational production by multiplying the number of smaller independent evaporators often results in increased maintenance, and in many technologies it limits the application of film evaporators for industrial large-scale production, such as, for example, the recyclization and refining of mineral oils. The length of runs of the high-capacity evaporators is limited by the gradual clogging of the surface by residues of decomposition after the thermal treatment of a distilled liquid. When wipers in the form of rotating segments are used having the direction of rotation opposite the direction of natural film flow, the film is lifted; this increases the risk of the gradual clogging of the evaporating surface so that the device requires periodic cleaning. With tall evaporating cylinders there is the possibility of the torsional deformation of the wiper in the lower part of the evaporator.

All these drawbacks are eliminated in a block short-way evaporator with wiped-off film in accordance with the invention; in such evaporator parallel vertical double-sided flat evaporators and double-sided flat condensers forming a continuous block are disposed in alternation in one or more containers forming vacuum chambers. Separating partitions at the bottom form alternately disposed collecting troughs for distillate with outlet tubes for the distillate, and collecting troughs for the residue with outlet tubes for such residue. Feed tubes for the inlet of distilled liquid are led into the bottom of the chamber(s) through double-sided flat evaporators into distributing troughs in their upper part. Every double-sided flat evaporator is held in the bottom through the inlet tube for the heating medium and the outlet tube for the heating medium. At every double-sided flat evaporator there is disposed a supporting frame for a wiper; on both sides of the evaporator the frame is held on eccentrically located pins mounted on discs. Two discs are mounted on each one of a plurality of driven shafts, the bearing box of which is mounted on the inner side wall of the container.

To provide the motion of the supporting frame together with the wiping segments, a driving shaft is connected with driven sprockets on the drive shaft through chains. Wiping segments formed by wiping bars with overflow holes and supported on a channel bar are set into guiding holes on the supporting frame of the wiper and are biased by a spring. Dephlegmation bands are held on the supporting frame of the wiper, which bands encroach behind the supporting frame for the wiper. For multistage distillation, the feed tube of a vacuum chamber of a higher vacuum stage is connected either with the outlet tube for the residue of a vacuum chamber of lower vacuum stage for the successive collection of fractions, or with the outlet tube for distillate of the vacuum chamber of lower vacuum stage for redistillation in such way as to form a liquid seal between the lower vacuum stage and the higher vacuum stage.

In comparison with the up-to-now known short-way evaporators with wiped-off film, the block short-way evaporator according to the invention has several advantages. Its construction allows the use of a block molecular evaporator having an effective evaporating area, for example, of 70 to 80 $m^2$ without any difficulty; such evaporator can process up to 40,000 tons of feedstock per year in continuous production. In principle, it is possible to build up devices with even higher capacity, the number of block components being limited only by the length of the vacuum chamber. The largest of the up-to-now known short-way evaporators on the basis of cylindrical bodies have an evaporating area of 36 $m^2$; however, this area is reached by increasing the height of the evaporating cylinder at its smallest diameter, in contrast to theoretical requirements for the molecular distillation. This decreases the evaporative capacity of the device. In practice, the current evaporating area is around 10 to 20 $m^2$.

The block evaporator according to the invention is productively more simple, because with the treatment of cylindrical evaporating areas of large diameters the relatively strict requirements for maintaining the accuracy of curvature of such surface is not necessary. The quantity production of wiping segments in the form of straight bars as well as straight dephlegmation bands is also substantially simpler. For these reasons, the cost of production of the device is also lower. The risk of splashing of microdrops from the rotating wiper is minimized by the elimination of circular motion of the wiper in the block evaporator according to the invention. As a result of this, the distance between double-sided flat evaporator and double-sided flat condenser can be narrowed; this is not only in accordance with the theoretical requirements of molecular distillation, but also this reduces the empty space which must be evacuated. The torsion of supporting rods of wipers for long cylinders with the drive for circular motion is also eliminated. Assembly, maintenance and operation are simple.

The regular feed distribution around the whole perimeter of single double-sided flat evaporators as well as the functioning of the wipers can be functionally tested with an open chamber cover. The motion of the wiper requires only the use of common vacuum packing of a shaft rotating at a low speed. Also, there is the guarantee of high device capacity by using both sides of a double-sided flat evaporator; the thickness of the wall forming the evaporating area remains relatively small.

This results in a higher heat efficiency of the process, and in the suppression of thermal decomposition with a smaller thermal gradient between film and heating medium. Heat transfer into the surroundings is a minimum, and there is an advantageous energy balance and the elimination of thermal stress of vacuum packings. A great advantage of rotary wiper motion is in its double-phase character, wherein with the motion of the wiper in the upward direction a hoisting, turning up, and homogenization of the film takes place, and with the motion of the wiper in the downward direction continuous self-cleaning of the evaporating area takes place. These results permit the continuous operation of the apparatus over long periods. A plurality of vacuum chambers of the block evaporator according to the invention, for example, with vacuum and temperature gradation, can be mutually connected without using any interpumps.

The invention will be more readily understood upon consideration of the accompanying drawings, in which:

FIG. 1 is a view in vertical longitudinal section through a preferred embodiment of evaporator in accordance with the invention, the section being taken along the line 1—1 in FIG. 2;

FIG. 3 is a schematic view, partially in section, showing the elastic clamping of wiping segments on the supporting frame of the wiper;

FIG. 4 is a view in side elevation of the structure shown in FIG. 3, the view being taken in the direction from right to left in FIG. 3;

FIG. 5 is a fragmentary view in the bottom plan of a wiping bar and its supporting angle bar.

Figure 2:
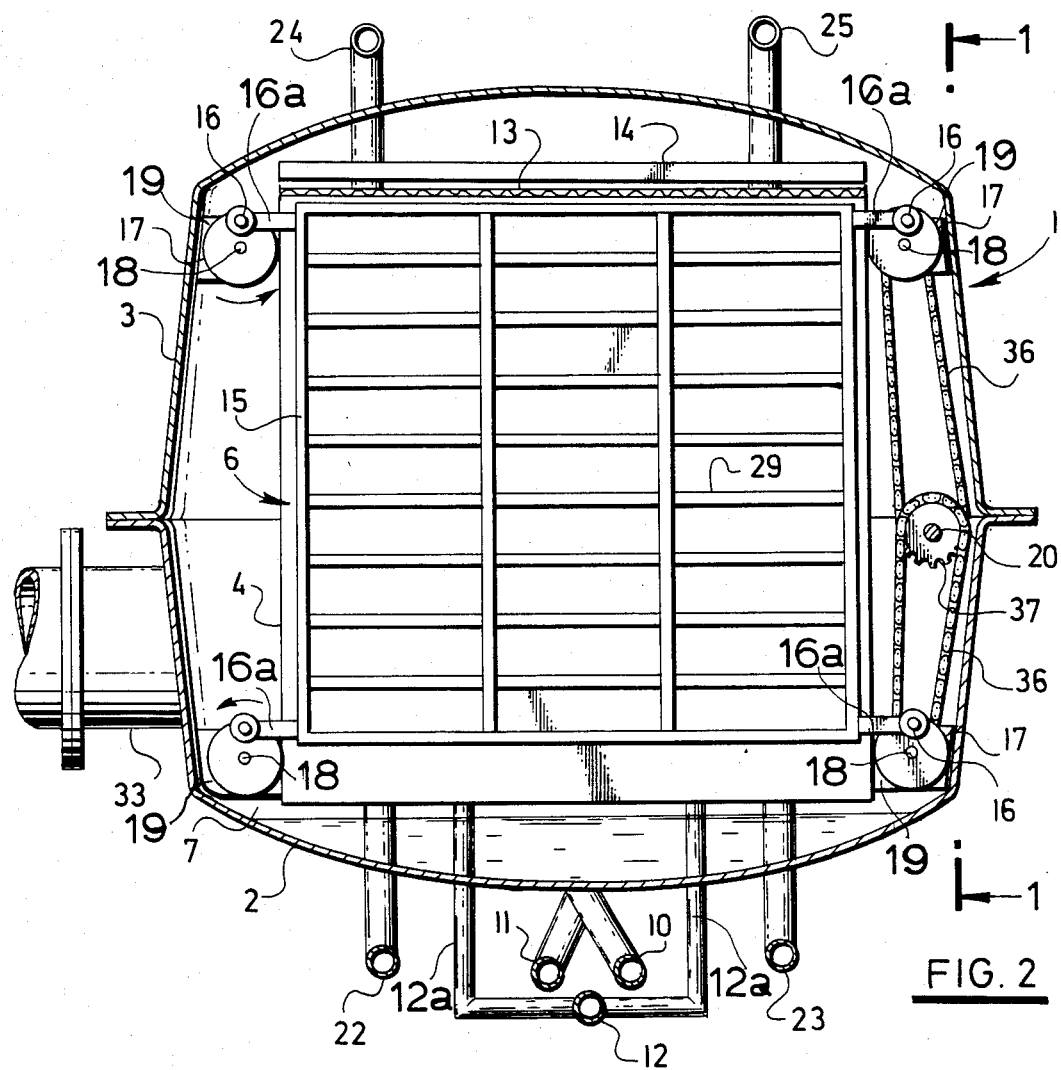
FIG. 2 is a view in transverse section through the vacuum chamber of the block evaporator shown in FIG. 1, the section being taken along the line 2—2 in FIG. 1.
Figure 6:
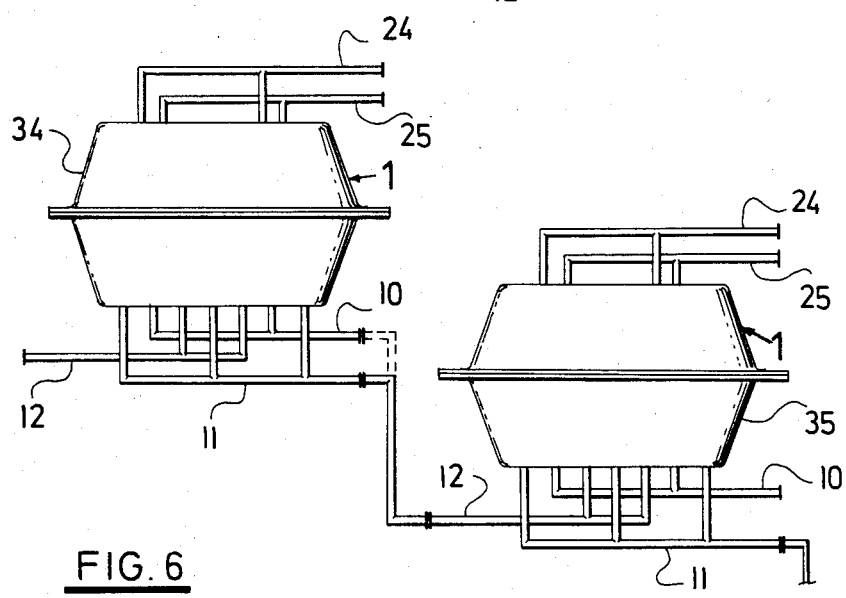
FIG. 6 is a schematic view in side elevation of a system made up of a plurality (two shown) of vacuum chambers forming a multistage molecular evaporator in accordance with the present invention.

As indicated above, the molecular evaporator of the invention may include from one chamber to several similar chambers. One such chamber is shown specifically in FIGS. 1 and 2. The vacuum chamber 1 shown in FIGS. 1 and 2 has an enclosure with a bottom half 2 and a top half 3 which are sealingly connected by mating flanges at their confronting top and bottom edges, respectively. Within the vacuum chamber 1 and disposed in parallel vertical spaced relationship are double-sided flat evaporators 4 and double-sided flat condensers 5 which are located in alternation and uniformly spaced from each other, this block or system always starting and ending with a double-sided flat condenser 5. The distance between each double-sided flat evaporator 4 and its confronting double-sided flat condensers 5 is such that it permits the evaporator to operate in a short-way evaporation mode, such distance being between 30 and 60 mm. The double-sided flat evaporators 4 are affixed to the bottom half 2 of the enclosure 2, 3. The double-sided flat condensers 5 are affixed to the upper, cover portion 3 of the enclosure parallel to each other and to the evaporators 4 by coolant inlet tubes 24 connected to the evaporators 4 and by coolant outlet tube 25 connected to the evaporators 4. Each of the flat evaporators 4 is affixed to the bottom portion of the enclosure by an inlet tube 22 for the heating agent, connected to the evaporators, and by a feed tube 12 the branches 12a of which are distributed uniformly along the length of the main extent of the feed tube in order to distribute the liquid being fed uniformly throughout the block or system.

Each of branches 12a passes through the inside of the respective double-sided flat evaporator 4 and extends upwardly therein so that its upper end discharges into a cogged or comb-shaped distributing trough 13, which advantageously can be made adjustable, thus insuring that the top of the double-sided flat evaporators 4 is in the form of a flat horizontal plane. A foam catcher 14 is disposed above the distributing trough 13. The bottom part 2 of the enclosure is alternately divided by vertical separating partitions 7 into a collecting trough 8 for receiving distillate and into a collecting trough 9 for receiving residue, depending upon which condenser section 5 is above the corresponding one of troughs 8 and 9. An outlet tube 10a is connected to each distillate connecting trough 8, tubes 10a being connected to a main distillate discharge pipe 10. Connected to each residue connecting trough 9 there is an outlet tube 11a, all of the tubes 11a being connected to a common residue outlet tube 11.

A wiper assembly, generally designated 6, is disposed on both sides of each of the double-sided flat evaporators 4, wiper 6 being made up of a supporting frame 15 upon which there are supported wiping segments 26 on horizontally disposed supporting angle bars 29 in a manner more clearly shown in FIGS. 3, 4 and 5, to be described hereinafter. Secured to the non-evaporative walls of the double-sided flat evaporators 4 outwardly beyond the corners of the frame 15, there are bearing boxes 19. Each bearing box 19 supports a horizontal driven stub shaft 18, each shaft 18 having a disc 17 secured to each of its opposite ends. Each disc 17 has a pin 16 located adjacent its periphery, the pins 16 extending into bearings on the outer ends of connecting rods 16a which extend horizontally from the frame 15 adjacent the corners thereof.

Each of the shafts 18 has a toothed wheel, e.g. a sprocket 38 fixedly connected thereto, sprocket 38 being connected to a respective toothed wheel (sprocket) 37 on a main drive shaft 20 by a chain 36, shafts 18 and pins 16 are all similarly angularly disposed, so that turning of the driving shaft 20 rotates them all in synchronism, so that each point on the supporting frame 15, and each point on each of the wiping segments 27 is driven with a circular motion with respect to the evaporating surface of sections 4. The main driving shaft 20 extends through bearings 39 in the opposite side walls of the lower enclosure part 2, each of such bearings being provided with a vacuum seal 21. Vacuum chamber 1 is connected with a source of vacuum (not shown) by one or more tubes or conduits 33, as shown in FIG. 2, the location of such conduits 33 being chosen so that the axis of the tube 33 is directed along the main or flat surfaces of the double-sided flat condensers 5. High-capacity vacuum pumps, for example, Root's pumps, in combination with steam-jet pumps may be employed as the source of vacuum.

Turning now to FIGS. 3, 4 and 5, it will be seen that each wiping segment 26 (FIGS. 3 and 4) is composed of a wiping bar 27 which is usually made of suitable heat-resistant plastic material, for example, of polytetrofluoroethylene, and which is provided with overflow holes directed either perpendicularly to the axis of the wiping bar 27 or at an angle smaller than or equal to 45 degrees to one or the other side from the main axis perpendicular to the axis of wiping bar 27. Wiping bar 27, so far as its shape is concerned, is suitably adjusted in such a manner that an elongated trough forms in the film of distilled liquid is at first periodically lifted and respective vertical planes, the wipers being supported on the frames, double-sided flat condensers in the chambers disposed in alternation with the evaporators so that they form a continuous block, on the bottom of the chamber there being distillate collecting troughs with distillate outlet tubes, the distillate collecting troughs being disposed below the double-sided flat condensers and being formed by separating partitions, residue collecting troughs alternating with the distillate collecting troughs and disposed below the double-sided flat evaporators, the residue collecting troughs being provided with residue outlet tubes, and feed tubes which are led through the bottom of the chamber and the double-sided flat evaporators into separating troughs in the upper part of the double-sided flat evaporators, the wipers being supported on the frames, the frames being rectangular in shape, the means for driving the frames in orbital motion comprising eccentric means disposed in driving engagement with the respective corners of the frame, and means for driving all of said eccentric means in synchronism.

2. A block short-way evaporator according to claim 1, wherein every double-sided flat evaporator is held in the bottom of the chamber by an inlet tube for heating medium and by an outlet tube for heating medium, and every double-sided flat condenser is held in the upper part of the chamber by an inlet tube for cooling medium and an outlet tube for cooling medium.

3. A block short-way evaporator according to claim 1, wherein said means for driving all of said eccentric means in synchronism comprises sprockets and chains.

4. A block short-way evaporator according to claim 1, wherein the means for driving all of the eccentric means in synchronism comprises toothed wheels.

5. A block short-way evaporator according to claim 1, wherein the wiping means are formed by a plurality of wiping segments in the form of bars provided with overflow holes, the bars being supported in metal angle bars, the angle bars being supported on the frame and thrust thereagainst by a spring.

6. A block short-way evaporator according to claim 1, comprising dephlegmation bands supported on the supporting frame.

7. A multistage block short-way evaporator comprising a plurality of vacuum chambers with evaporators and condensers according to claim 1, said multistage evaporator having a vacuum chamber of higher vacuum stage which is connected to a vacuum chamber of lower vacuum stage, the feed tube of the vacuum chamber of higher vacuum stage being connected with the residue outlet tube of the vacuum chamber of lower stage for successive collection of fractions.

8. A multistage block short-way evaporator having a plurality of vacuum chambers containing evaporators and condensers according to claim 1, one of said vacuum chambers being of higher vacuum stage and another of said vacuum chambers being of lower vacuum stage, and means connecting the feed tube of the vacuum chamber of higher vacuum stage to the distillate outlet tube of the vacuum chamber of lower vacuum stage for redistillation, and means for forming a liquid seal between the lower vacuum stage and the higher vacuum stage.

* * * * *